Sept. 29, 1936.  A. L. KRONQUEST  2,055,934
METHOD OF MAKING CAN BODIES FROM BLACK PLATE
Filed July 5, 1933
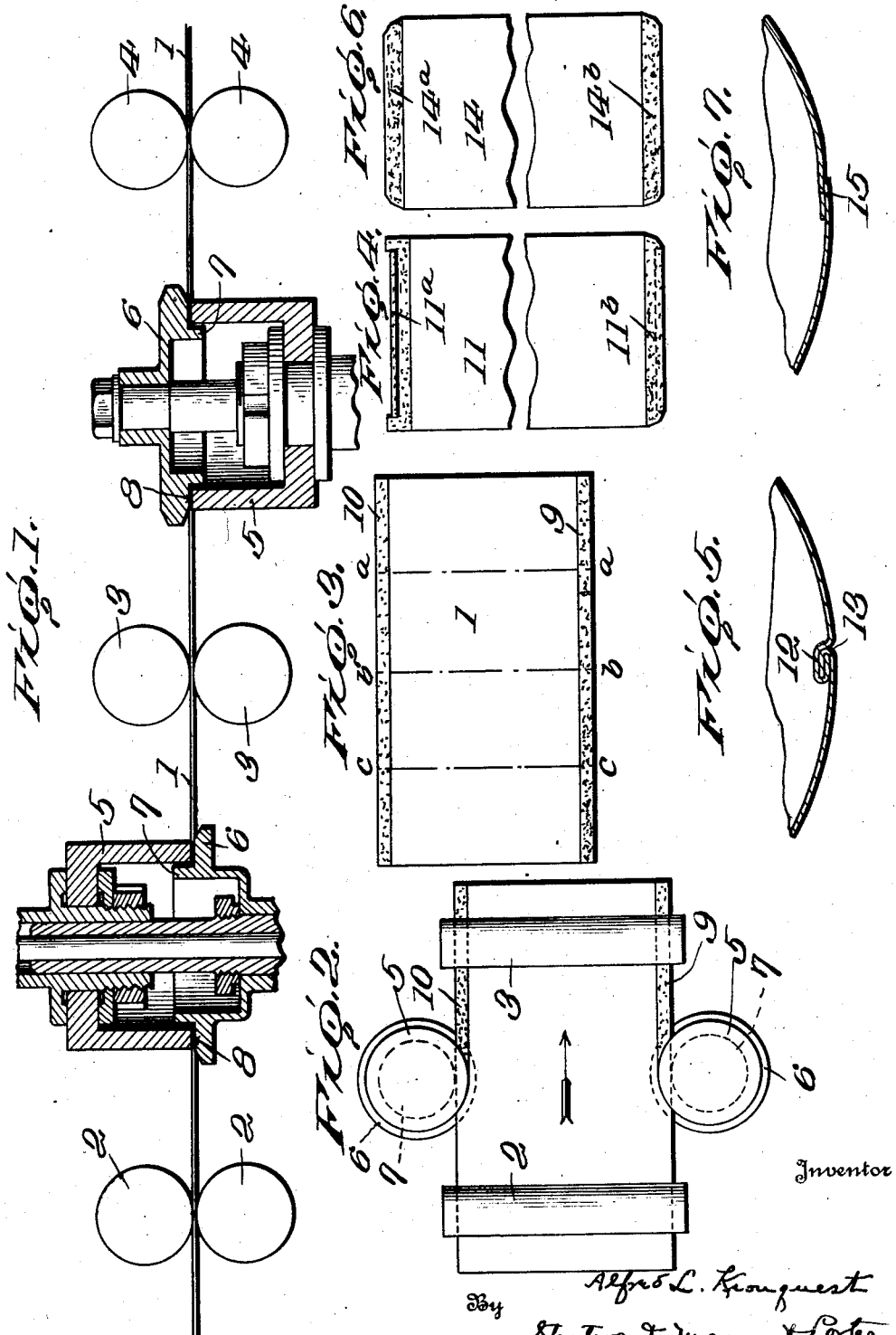

Patented Sept. 29, 1936

2,055,934

UNITED STATES PATENT OFFICE 2,055,934

METHOD OF MAKING CAN BODIES FROM BLACK PLATE

Alfred L. Kronquest, Syracuse, N. Y., assignor to Continental Can Company, Inc., New York, N. Y., a corporation of New York Application July 5, 1933, Serial No. 679,110

1 Claim. (Cl. 113—120)

The invention relates to new and useful improvements in a method of making can bodies from black plate. It is customary to coat sheets of mild steel or black plate with tin, and to make from said tin sheets metal cans for packaging articles. The purpose of coating the sheet with tin is to prevent oxidation of the surface of the steel. Sheets of tin when the surface thereof is cleaned from dirt and grease can be readily joined by solder bonding. Considerable difficulty has been experienced, however, in solder bonding or directly connecting the parts of a black sheet for making an hermetic joint, due to the fact that the scale formed by the oxidation of the metal prevents the adhering or fusing of the solder bond to the black plate.

An object of the present invention is to provide a method whereby black plate may be shaped into a can body, the side edge portions positioned for side seaming, and said side edge portions joined by molten solder so as to provide an hermetically sealed joint.

A further object of the invention is to provide a method whereby the body blanks forming the can bodies may be treated in the region of the edge portions which are to be joined in the side seam so as to produce in the black plate a clean metallic surface for solder bonding.

A still further object of the invention is to provide a method whereby the side edge portions which are to be joined may be subjected to abrading devices for removing the scale and oxide so as to produce in the black plate a clean metallic surface for solder bonding.

These and other objects will in part be obvious and will in part be hereinafter more fully disclosed.

In the figures of the drawing there is shown diagrammatically the various steps forming a part of the method constituting the new invention.

Figure 1 illustrates diagrammatically an apparatus which may be used for abrading the edge portions of the sheet in the region where said edge portions are to be connected to form the side seam;

Fig. 2 is a plan view of a portion of the apparatus;

Fig. 3 is a plan view of a sheet which has been subjected to an abrading action for producing in the black plate a clean metallic surface at the edge portions which are to be joined by solder bonding, said figure illustrating the manner in which the sheet may be cut into body blanks;

Fig. 4 is a body blank which has been notched with the hooks formed thereon preparatory to the shaping of the blank into can body form;

Fig. 5 is an enlarged sectional view showing the edge portions interlocked and joined by solder bonding;

Fig. 6 is a view showing a body blank which is to be shaped into a can body and the edge portions thereof joined in a lap seam, and Fig. 7 is an enlarged sectional view of a can body made from the blank shown in Fig. 6, with the edges joined by solder bonding.

The invention has to do with a method of making can bodies from black plate, that is, plates of mild steel rolled to proper gauge for shaping into can bodies. The black plate when exposed to the oxygen of the air is subject to oxidation, producing scales thereon. It is usually customary to coat the black plate with tin so as to prevent such oxidation. When the black plate is coated with tin, edge portions of a blank formed therefrom when cleaned of grease and dirt may be readily joined by solder bonding. This, however, cannot be so readily accomplished in connection with the forming of cans from black plate which have not been coated with tin. I have found, however, that when the edge portions of the black plate which are to be brought together in the side seam of a can body are subjected to abrading devices so as to remove the scale and oxide coating thereon, then said edge portions can be readily joined by solder bonding. The solder, however, must be applied while there is still a clean metallic surface for the molten solder to contact with. The invention includes the steps necessary for the producing of the clean metallic surface in the black plate forming the can body and the joining of the edge portions while the metal of the black plate is still free from oxidation, which would prevent the solder adhering or fusing to the metal parts and thus joining the same so as to form an hermetically sealed joint.

It is thought that the invention will be better understood by a brief reference to the diagrammatic views in the drawing which shows the various steps essential to the carrying out of the same. The black sheet is cut into strips indicated at 1 in Figures 2 and 3 of the drawing. The strip is passed through feed rollers 2, 2, 3, 3 and 4, 4 which feed the strip continuously in a forward direction while the edge portions thereof are being subjected to abrading devices for removing the formed scale and oxide collecting on the plate. Located between the pairs of rollers 2, 2 and 3, 3 are two abrading units. Each abrading unit includes a grinding wheel 5 in the form of a cup, This grinding wheel 5 may be made of any suitable abrading material. Cooperating with the grinding wheel 5 is a supporting wheel 6. These two parts rotate together. The two units are similar in construction. The rotating support 6 is provided with an upstanding flange 7. Radially outside of the flange 7 is a ledge 8, and the sheet passes over this ledge, contacting with the flange which serves as an edge guide. There are two of these abrading units, one at each side of the sheet. They are similar in construction. The sheet passes over the supporting ledges 8 on the two units, and the flanges 7 of the abrading units hold the sheet to its proper line of travel. The sheet passes beneath the grinding wheel 5 which rests thereon. This grinding wheel and the support beneath the same rotate at a speed of from two to five thousand revolutions per minute. The sheet moves continuously so that the edge portions are progressively presented to these two grinding wheels or abrading devices. These abrading devices will grind the upper surface of the sheet along the edge portions thereof, thus producing marginal edge portions 9 and 10 from which all oxide and scale is removed, leaving in the black plate a clean metallic surface. The feed rollers are spaced so that one pair or the other are always gripping the sheet while the grinding wheels are operating thereon. After leaving the feed rollers 3, 3, the sheet passes through another pair of abrading devices which are similar in construction, except that the grinding wheels 5 are on the under side of the sheet, and the cooperating support 6 is above the sheet, with the ledge 8 overlying the edge portion of the sheet and the flange 7 guiding the sheet. These grinding wheels operating on the under side of the sheet prepare the under edge portion of the sheet in a manner similar to that described above so as to provide in the black plate a clean metallic surface. Means is provided, of course, whereby the upper grinding wheel is raised and the under one is lowered to permit the black sheet to enter freely between the grinding wheel and the supports cooperating therewith. The sheet, as shown in the drawing, is of a width corresponding to the length of a body blank and is of a length corresponding to the width of four body blanks. The sheet 1 with the edge portions thereof prepared in the manner described above, is next submitted to a slitter which cuts the sheet along the lines a—a, b—b and c—c. This produces four body blanks. The ends of the sheet are trimmed in the usual manner so that the body blanks are of proper size for the body making machine. It is essential that the sheet after the edges have been ground so as to produce in the plate a clean metallic surface, shall be presented to the slitter machine and formed into body blanks and the body blanks presented to the body making machine and formed into the can body before the oxides and scales again form thereon, or otherwise it would not be possible to solder bond said edge portions. It is preferred, therefore, that the sheet when presented to the abrading devices shall pass at once to the slitter and from the slitter to the body maker in which the body is formed and the edges joined by soldering.

The body blanks, one of which is indicated at 11 in Fig. 4, is notched and formed with hooks in the usual manner. The upturned hook of the body blank 11 is indicated at 11a, and the downturned hook is indicated in broken lines at 11b. The edge portion of the metal is ground so as to provide a clean metallic surface in the black plate of a width corresponding in extent to the overlying hooks, so that when the blank is shaped into cylindrical form, the hooks interlocked and bumped, the entire portion of the metal which is interfolded will be freed from scale and ready for solder binding. The portions of the metal to be joined are fluxed in the usual manner, and molten solder is applied to the interfolded parts and will flow along the clean surfaces of the metal, producing a solder bond which extends throughout the entire limits of the side seam. The interlocked parts are indicated at 12 and the solder bond at 13.

In Fig. 6 of the drawing, the body blank 14 is shown as having its side edge portions 14a and 14b shaped so as to provide a lap seam. The body is shaped into cylindrical form, and the edge portions lapped and then joined by a solder bond indicated at 15. The contacting edge portions of the blank are ground in the manner described above, so as to produce in the black plate, clean metallic surfaces, and when the flux and solder is applied, it will flow throughout the entire extent of the lap portions and join the same so as to provide an hermetic joint.

From the above it will be apparent that I have provided a method whereby black plate can be readily formed into metal can bodies and the side edge portions solder bonded so as to produce a strong hermetic joint. While I have referred to black plate as consisting of mild steel, it will be understood that the term is used to cover alloyed steels without any tin coating thereon. While grinding wheels are described for removing the scale to produce in the black plate a clean metallic surface, it will be understood that other types of abrading devices may be used for this purpose. Again, it may be stated that the essential features of the invention consist in the producing in the black plate the clean metal surfaces in the regions where the parts are to be joined into a side seam, and the forming of the sheets into body blanks and the body blanks into can bodies in a substantially continuous operation, so that the solder bonding is accomplished before there is any chance of the cleaned surfaces oxidizing and scale forming which would prevent efficient solder bonding. While it is preferable that the sheets shall pass continuously from one operating device to another, it will be understood, however, that after grinding, the sheet may be manually presented to a slitter, and after slitting it may be presented to a body maker, with a slight time interval between the steps of the method, but insufficient to prevent any objectionable oxidizing of the metal surface.

After the can body is completed in the manner above described, it is, of course, flanged, and the closure ends attached thereto in the usual manner. It is obvious that the portions of the body blank between the ground surfaces may be coated with lacquer, if desired, or decorated while in the sheet, and the sheet, after it is lacquered or decorated, may be subjected to the abrading device for preparing the edge portions for soldering.

Having thus described the invention, what I claim as new and desire to secure by Letters Patent, is—

The method of making can bodies from sheet black plate consisting in cutting the sheet into strips, each of which contains a plurality of body blanks and is of a width equal to the length of the body blank, subjecting the strip to abrading devices for removing sufficient of the metal from the surface thereof at the side edge portions to produce a clean metallic surface, immediately cutting the strip into body blanks so that the clean metallic surfaces in each blank are disposed at the edge portions which are to be united in the forming of the can body, shaping the blank into a can body with the clean edge portions positioned for side seaming and immediately applying to said clean metallic surfaces molten solder for joining the same to complete the side seam.

ALFRED L. KRONQUEST.